United States Patent [19]

Texier

[11] Patent Number: 5,119,476
[45] Date of Patent: Jun. 2, 1992

[54] METHOD FOR GENERATING DIALOGUE-WINDOWS VISUALLY DISPLAYED ON A COMPUTER-SCREEN AND EQUIPMENT FOR IMPLEMENTING THIS METHOD

[75] Inventor: Michel Texier, Antony, France

[73] Assignee: Bull S.A., Paris, France

[21] Appl. No.: 369,232

[22] Filed: Jun. 22, 1989

[30] Foreign Application Priority Data

Jun. 22, 1988 [FR] France .................... 88 08381

[51] Int. Cl.⁵ .......................................... G06F 15/63
[52] U.S. Cl. ................................. 395/157; 395/148
[58] Field of Search .................. 364/518, 521, 523

[56] References Cited

U.S. PATENT DOCUMENTS 4,794,386 12/1988 Bedrij et al. ............... 364/518

FOREIGN PATENT DOCUMENTS 0067303 12/1982 European Pat. Off. .
0230994 8/1987 European Pat. Off. .
88/02147 3/1988 PCT Int'l Appl. .

Primary Examiner—Heather R. Herndon
Attorney, Agent, or Firm—Lowe, Price, LeBlanc & Becker

[57] ABSTRACT

A method of creating data entry forms provides for the display of dialogue-windows on a computer system screen operating in a multi-window graphic mode. The windows are displayed by organizing the windows into one or more pages, each of which can be materialized by one screen window. In each page, at least one active zone, page or part of a page is defined which can react to an external event such as an operator initiated input. The active zone is then associated with a set of "editor" functions, wherein at least one reaction function of the active zone is responsive to activation by an external event or input.

42 Claims, 3 Drawing Sheets

FIG.1

METHOD FOR GENERATING DIALOGUE-WINDOWS VISUALLY DISPLAYED ON A COMPUTER-SCREEN AND EQUIPMENT FOR IMPLEMENTING THIS METHOD

TECHNICAL FIELD

The present invention concerns the generation of dialogue windows displayed on a computer screen and serving as operational interfaces in various applications such as cards, instrument panels, menus, data display or acquisition masks, dialogue boxes etc. A very common application for such dialogue windows consists in the interactive emulation on the screen of actual forms generally comprising fixed elements grouped as a skeleton and active zones, in particular filling zones capable of receiving variable data in a predetermined structure both from the user and from the computer system. Accordingly the dialogue windows of the invention shall also be indiscriminately termed "forms" without thereby restricting it in the above sense. In particular the expression "form" may denote furthermore an interactive and structured presentation which can be visualized at the arbitrary computer or information screen both at the input and at the output, in particular data from external events allowing to activate certain screen zones and transmitted through a keypad and/or a pointer system such as a mouse (illustratively when performing a menu selection, when triggering a particular action...).

BACKGROUND ART

In the past few years and thanks to the appearance of individual work stations and of micro-computers, a large number of non-specialized users have gained access to computers in their most varied forms such as data banks, office automation, expert programming, artificial intelligence. Frequently such access is in the form of an interactive mode wherein the user can enter into a dialogue with the system both at the input and at the output. In this new context, it happens that the user increasingly requires visualized forms that may be changed in order to replay on a screen the amazing diversity of documents present on his desk. Obviously this adaptation must be comparatively easy to carry out by the user and in particular the undesirable constraints resulting from the operational environment application-/user to which the sought form shall be related must be avoided or reduced.

The object of the invention is the generation of forms displayed on a screen of a computer system and being inherently autonomous while nevertheless allowing this generation to be of a matching nature (permitting variable routings and modifications) and furthermore being evolutionary depending on the experience of this user (the generation being intended as well for non-specialist users as for expert programmers to whom wide latitude is offered to create forms in their programs).

DISCLOSURE OF THE INVENTION

The invention offers a method for generating dialogue windows, hereafter called forms, which can be displayed on the screen of a computer system comprising a central processing unit and a central memory loaded with operational software, said screen operating in a graphic multi-window mode, each window being displayable on the screen by a contour and provided with a system of local coordinates and with a graphic context, where this method is characterized by the following operations:

1. The form is set up as one or several pages each displayable on a screen window, 2. At least one active zone, page or part of page capable of reacting with at least one data unit constituted by an external event is defined in at least one page, 3. A set of functions, hereafter termed "editor" and comprising at least one reaction function of the active zone responsive to activation by one or more external events, in particular the filling of said zone with variable data, is associated with said active zone, and, in optional manner, a function of editor-validation capable of validating said activation.

The form so created evinces a pronouncedly autonomous character (resulting from its generating mode) because being structured around a base module consisting of an interactive zone, that is, the dual zone which can be displayed on the screen and the editor incorporating the reaction function to the zone. This character is further reinforced by the ability to incorporate into the editor an activation-validation function, in particular for zone filling, which makes it possible to verify the triggering of the reaction. Generated and structured in that manner, the form is easily carried toward such and such user application, the more so its modular structure allows easy modification.

It must be borne in mind that the form generation may be made easier yet by recursivity for each page or part of a page to define active sub-zones in the manner of the same model as that of the above defined active zones.

Furthermore the method of the invention allows simple, reliable and easily checked hook-up with a user-application both at the screen data input toward the system as at the the system output toward the screen.

In a first embodiment mode of the method, an active zone is related not only to its editor but further to at least one action function associated with a user-application program and selected from the following:

a post-validation action-function for the validation of said active zone, ie, FAV, a pre-display action-function at the display data screen for the data contained in the active zone, ie FAA.

In practical terms, the hook-up with the user application is implemented by means of the action function of which the definition in the form itself may be minimized, that is down to identification allowing to call it. Such a hook-up in no way changes the form's autonomous and portable character.

The method of the invention allows a large number of different embodiment modes which are advantageous both as regards generating the forms and their flexibility of application. Such implementing modes shall be discussed in detail below. In particular as regards another embodiment variation of the method of the invention, the forms are generated either by creation from scratch or by modification or by re-designing a pre-existing form. In still another variation, the method of the invention is implemented in programmed or interactive manner by using a set of of specific, complementary instructions to a programming language of which the programmed interface is loaded into said data or computer system. Advantageously the programming language is of the object and interpretation type (allowing the creation of associated methods and structures).

Another object of the invention is equipment with which to implement a method for generating dialogue windows on the screen of a data or computer system, where this hardware comprises:

a data system with a central processing unit and a central memory loaded with an operational software.

said system comprising at least one screen operating in the multi-window graph mode and at least one input device capable of displacing a pointer on said screen, an interface programmed by means of a programming language loaded into said system, a set of software developed at least in part in said programming language by following at least one of the specifications defined by the diverse implementing modes shown herein of the method of the invention.

Presently the method of the invention shall be described in illustrative but non-limiting manner in reference to the attached drawings showing partial and schematic views of the screen of a data system upon which is carried out the method of the invention.

BRIEF DESCRIPTION OF THE DRAWINGS

FIG. 1 shows two forms following creation,

BEST MODE FOR CARRYING OUT THE INVENTION

Figure 2:
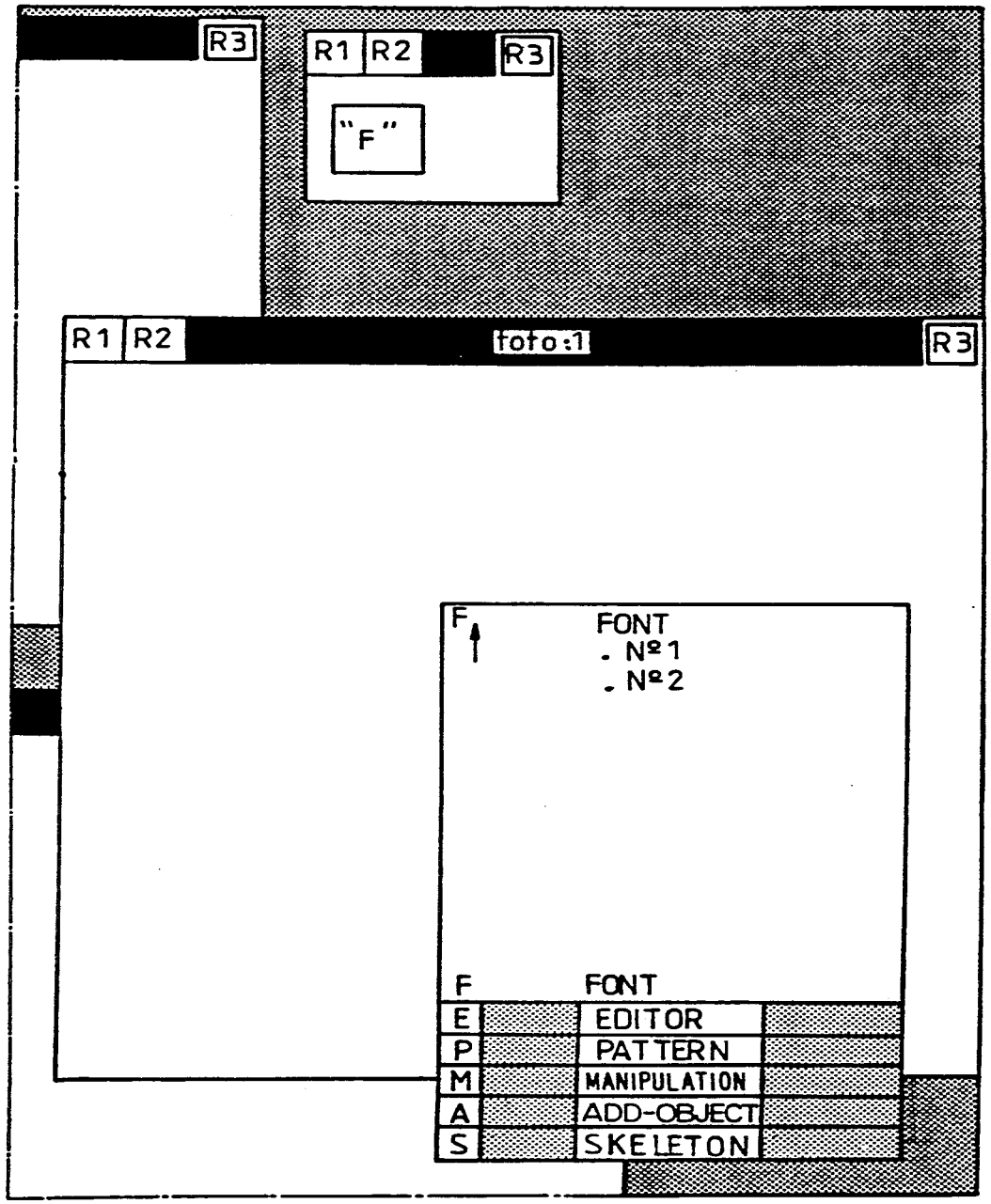
FIG. 2 shows a form in the initial stage of creation in association with a menu for creating the form.

Preferably the method of the invention is implemented using a data system comprising at least a central processing unit, a central memory, a keyboard and an input device capable of positioning a cursor on the screen, for instance a mouse. The system furthermore includes hardware and/or software to operate the screen in the multi-window graphic mode.

The method of the invention is implemented in all its modes shown below by having this data system so defined carry out a set of instruction programs defined and developed to carry out at least three operations:

1. Organizing the form into one or several pages that can be embodied each by a screen window, 2. Defining at least one active zone, page or part of a page defined in at least one page and capable of reacting to at least one data unit consisting of an external event, 3. The association to said active zone of a set of functions, hereafter called "editor", comprising at least one reaction function of the active zone to activation by one or several external events, in particular the filling of said zone with variable data, and optionally an editor-validation function which can validate said activation.

Moreover the data system loaded with this set of programs constitutes an embodiment mode of the equipment with which to implement the method of the invention even in all its variations discussed below.

Be it borne in mind that both the method and the equipment of the invention assure a technical effect, namely either the appearance of a zone of interactive dialogue (form) on the screen or the physical writing into the central memory of coded data in the form of electric signals and as a block representing the defining structure of the form.

Obviously too the invention is not restricted to the particular implementation described below, that is, to the particular equipment being used, or its type, or to the programming language standard being used (here the LISP standard). In particular, the PROLOG standard, which may offer an object layer, also is significant as regards the implementation of the method of the invention. Moreover, where it is desired to carry out the method of the invention in the interactive mode, it will be necessary to resort to a so-called interpreted language, that is, a language allowing direction interpretation of each instruction by the machine.

In the present case the system employs a SUN machine, series 3/50, made by Microsystems Inc., having a memory capacity of 4 megaoctets and associated with a high-resolution screen in support of multi-window display. This system is equipped with an operating software UNIX (by ATT) together with a graphic environment software X-Windows (version X.11) by O'Reilley and Associates Inc (Newton, Mass. 02164, USA).

In general a multi-window graph mode implies defining a window as being displayed on the screen by a rectangular frame and being provided with a system of local coordinates (illustratively x for the horizontal and y orthonormalized vertical) and where called for the definition of a graph context (such as the definition of the background, color and pattern, frame, a display title etc). In the X-Windows environment and for the window management system used in the present case, a horizontal bar appears over each window and represents a certain number of regions. Referring now to the Figures, the bar comprises a dark central zone carrying the window number and upon selection allowing to shift the window on the screen, further three side zones, zone R1 once selected allowing to move the window to the front of the screen, zone R2 once selected allowing to close the window and to reduce it to the state of an icon, and zone 3 once selected allowing to vary the window size.

The form generating method of the invention can be implemented either in totally programmed manner or in interactive manner by means of a particular software set denoted hereafter interactive software "F".

To make use of the inherent advantages of the object programming particularly matching the implementation of the method of the invention, such implementation shall be in the form of a LISP programming interface comprising an object layer, more specifically it will be the Le-Lisp interface in its 15-2 version (graphic function support) which was developed by L'INSTITUT NATIONAL DE RECHERCHES EN INFORMATIQUE ET EN AUTOMATISM (INRIA) at Rocquencourt, 78153 Le Chesnay. France.

To implement the method of the invention in programmed manner, the LISP functions available in the Le-Lisp version 15-2 interface shall be used. However these base functions have been supplemented by a number of functions, or original primitives which are themselves defined from the Le-Lisp version 15-2 interface (on account of latter's opening capacity) and which are recombined as the set of functions "F". Thereby time is saved and flexibility in use is achieved as regards portability compared to other machines for the interface so completed because the Le-Lisp 15-2 functions are directly interpreted to generate the corresponding instructions to the assembly code (in the present instance that of the virtual machine LLM3). Consequently only the "F" functions which are the most representative of the implementation of the method of the invention shall be presented and defined in detail, it being understood that the user familiar with the Le-Lisp language shall be able without undue difficulty to reconstitute complete definition of the other functions "F" presented tersely shown or merely hinted at.

Be it borne in mind that even though strongly recommended, the use of the "F" functions is not mandatory to implement the method of the invention. In any event, the data shown there are sufficient to allow a programmer-user familiar with the the Le-Lisp language to develop the LISP programs corresponding to the "F" functions without exceeding his knowledge, and also the LISP programs, using or not the "F" functions, thus making possible the form generation of the invention. Similarly this programmer shall have the choice of developing programs corresponding to the interactive interface "F" or complementary to it either in LISP or using other languages such as language C or assembly.

In practice and besides the Le-Lisp (15-2 version) interface constituting the core of the system, the following also are loaded, namely a set of programs termed "F" system and further comprising the set of functions LISP "F" complementary to the core primitives, the interactive software "F" and various files used either to operate the system (for instance a mouse interface) or resorted to by the user for specific applications.

Figure 1:
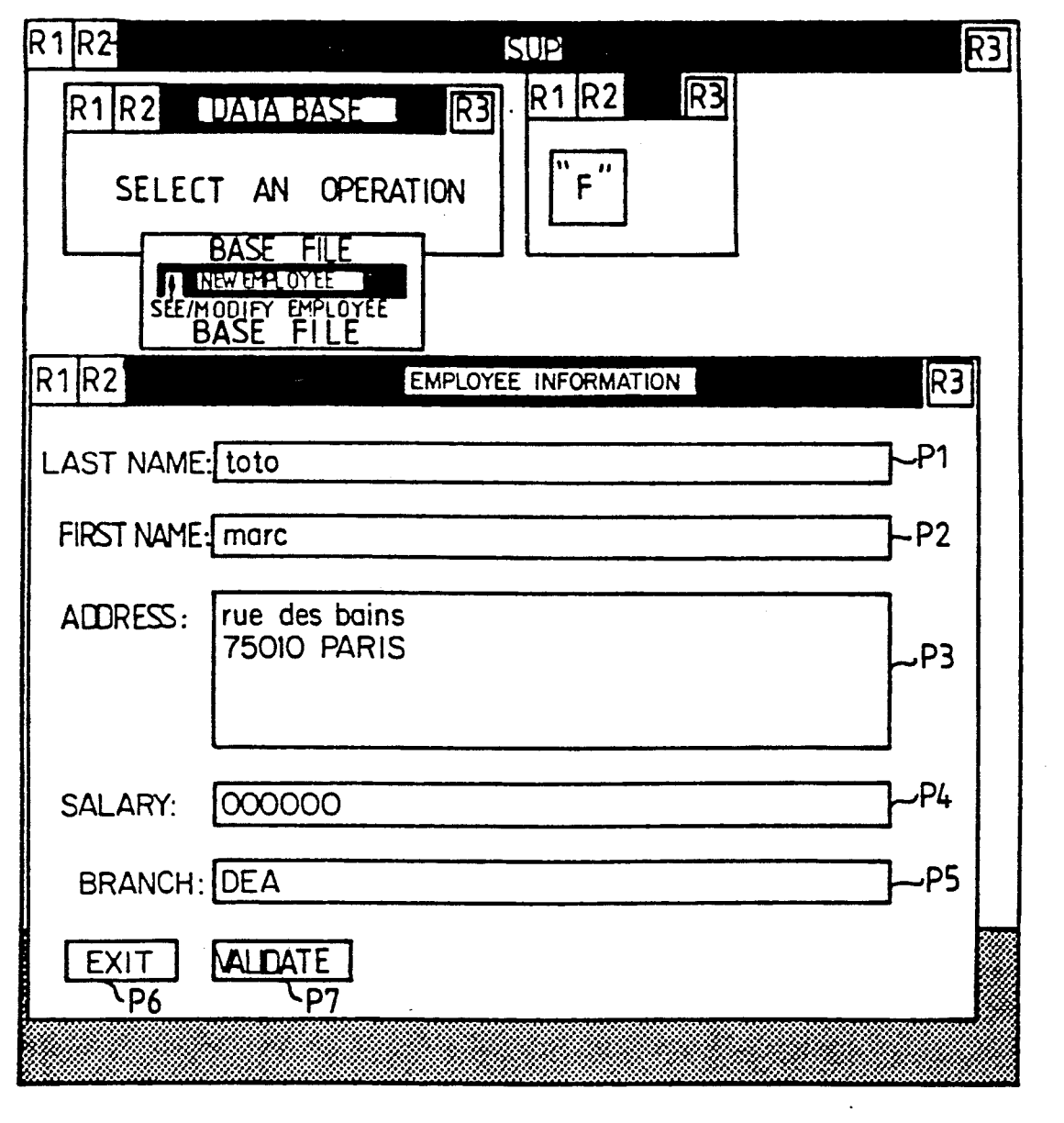

At the screen, the LISP interface takes the form of an Input/Output window denoted SUP which is associated to the main loop of the Le-Lisp (TOPLEVEL) interpreter—see FIG. 1.

The selected mouse is the three-button type, the left-hand button being associated by convention with selecting zones or graphic objects on the screen and editor calls, the right-hand button being used for specific operations such as handling certain menus and the center button being left free for the user. The external events from the mouse are processed by the pre-programmed mouse interface which moreover can recognize depression (down), release (up) of a button, the motion (drag) of the mouse and logic events such as the entry of the mouse pointer in the window. At the screen, the position of the mouse pointer is denoted by a small upward arrow (see the Figure). Obviously, the mouse can be replaced by any other cursor means such as optical pen or a graphic table without thereby transcending the scope of the invention. Moreover, the mouse interface is complemented by a keypad interface which is programmed both for the character keys and the pointer and control keys.

Before discussing in detail a variation of the method of the invention, it must be noted that the reader may consult the various instructions manuals for the above hardware and the reference manuals for the available software, especially those relating to UNIX, X-WIN-DOWS (X-11) and Le-Lisp (version 15-2).

In particular various functions, symbols, and expressions from the Le-Lisp (15-2 version) shall be used herein, retaining however the same coding and the same writing principles. Illustratively the expression below defining a LISP function.

(*NAME*<*x*>[<*y*>]) [*SUBR with* 1 *or* 2 *arguments*]

is interpreted as follows:

NAME is the name of the function,

<x> and <y> are the function parameters, the presence of the brackets [] denoting that the parameter <y> is optional, SUBR means that the parameters shall be evaluated as arguments of the function (in the LISP sense).

Before the method of the invention shall be exhaustively discussed below together with its features and programmed or interactive implementation, it will be advantageous for ease of understanding to provide several concrete examples of forms generated by the method of the invention.

Referring now to FIG. 1, a small nameless window showing the icon "form" ("F" inside a square frame) associated to the interactive software "F" appears on the window SUP at the top and on the right. This software may be called either in programmed manner into the window SUP or by selection into a utility menu associated with the window SUP.

FIG. 1 also shows the visual display of two forms generated by the method of the invention. These two forms are entirely independent, though used in the present case for the same user-application, namely a database management system. The first form realized in the window denoted "Data base" allows carrying out a temporary menu, ie the "Base file" regarding the operations on the data base file. The second form realized by the window denoted "Employee information" concerns an acquisition/display mask for a particular recording of the data base file.

In this embodiment the first form (denoted "table", not showing on the screen) comprises a single page (the screen window "data base") which in this particular case itself constitutes the active zone. This page comprises a skeleton consisting of inert data, the "string" SELECT OPERATION. This page is associated with the temporary menu (displayed by a frame straddling the lower window base) called BASE FILE offering the choice between the operation "new employee" (taken in this instance)to add a new entry to the file, and the operation "see/modify employee" to display an extant entry and possibly modify its contents. The temporary menu associated with the page by the editor "Temporary menu" (PM)is triggered by pressing the left-hand button of the mouse into the page and disappears at the editor output, that is when the left button is released. An operation shall be selected by clicking the left button into one of its two channels "New employee" and "See/modify employee". Due to a link between the form "Data base" and the user-application itself, the menu selection triggers the selected operation in the user application.

The second form (named "employee", not appearing on the screen) also comprises a single page (the screen window "employee information") having seven active zones or parts all in the form of rectangular frames. The first five zones (P1-P5)may receive variable information by means of filling (from the keyboard or the system) while the last two (P6-P7) each represent one skeleton consisting of the string EXIT or the string VALIDATE. These two zones P6-P7 are associated to the "click" editor (CL) and are activated when the lefthand button is pressed in the zone, (resulting in the video inversion), while releasing the button triggers activation validation and, through another so-called post-validation link, together with the user application, the performance of predetermined operations. The first five zones (P1-P5) are activated through an input to an editor (clicking the left-hand button of the mouse in the zone under discussion), thereby triggering authorization to fill the zone, in the present instance by means of text on one line or by means of text in a framed screen on the left for the zone P3. To terminate the description of the single page "employee information" of the form, this form includes a skeleton consisting of the names (shown in column) of the articles corresponding to the first five zones P1–P5.

The two following observations are advantageously kept in mind before detailing the structures of the forms generated by the method of the invention:

In the method of the invention, a form shall actually exist if it can be displayed (that is, loaded into the system central memory). It may be physically visible on the screen but this condition is not mandatory for the form's existence and definition. This original feature shall be widely used by another kind of link to the user application in the form of an action function for pre-display (the visual display call of the form triggering in the user application the performance of various pre-set operations).

A distinction must be made between the form generating operations called building mode from its filling operations; filling entails the possibility of an active zone coming under the control of an editor. Regarding the (construction mode) form generating operations, they combine on one hand the creation of all pieces and on the other hand the modification of an already created form.

Accordingly the method of the invention allows defining the form structure in the light of the points below:

1. A form obtained by the method of the invention consists of a set of pages which materialize on screen windows by the graphic server, each screen window at its creation being positioned relative to a system of coordinates linked to the graphic server (in the present instance the coordinate system associated to the root window defined by the environment X.11 and denoted by the dotted background in the Figures). In case there are several pages, they are linked to each other by reference to the form name but each bears a distinctive title which may merely be the form name followed by the creation number of the page such as "toto:1" in FIGS. 2 and 3.

2. An active zone, that is one associated with an editor to react to an external event when the editor itself is activated, for instance when the zone is being filled; may be either the page itself or part of it (visualized in the example described here by a rectangular zone). In fact this zone is an extension of a preset graphic object, here a graphic rectangle in particular defined by the coordinates of its upper left corner, its width and its height. This extension is carried out by means of variable information association, of the active or inert kind, under the control of an editor. In every case a form shall comprise at least one active zone.

3. A page may or may not contain skeleton objects, parts, editor identification (name), a post-validation function (if any, then associated to a user application by a link function), a pre-display action function (if any, then associated by a link function to a user application), active information and variable information following filling. The active information may be arbitrary on account of the editor display method. The skeleton objects are either preset graphic structures which can be handled as a block on the screen or icons, ie point memories. The page is activated by association with an editor followed by "filling" or by activating the graphic structure. In recursive manner one part may contain the same element types as a page, in particular the sub-parts recursively composed of active sub-zones.

The method of the invention employs the capital characteristic of the active zone editor. To meet the great many applications of the forms generated by the invention, a variation of its method incorporates the operation of defining and compiling a number of typical editors from which only one shall be selected during the association with the active zone.

Generally the editor manages the information filled into the active zone and determines latter's reaction to the external events, in particular to those from the keyboard and the mouse (for instance screen display of the contents, display, whether sequenced or not, drawing a line or a graph). The editor also manages its output, that is the stop of accounting for the external events and possibly the validation of the filled information.

The editors relate as well to the pages as to the parts. They are called or triggered by pressing the left button on the mouse into the page or the particular part. They may be released, in some cases automatically, upon releasing the button. Others may be released by clicking out of the particular part or page. This exit must be distinguished from the filling validation function which exists only in some cases. Lastly some editors allow functionalities accessible through right-hand button thanks to the display of a temporary menu.

The available editors for the example described herein are the following:

Line (LN)

Text editor blocking within the limits of the part (blocking prohibiting the insertion of a character once the right hand limit of the part has been reached), Triggering is effected by the appearance of the writing cursor.

Filling validation is effected by a carriage return or possibly by clicking out of the part.

Line with advance (LS)C.

Text editor allowing advance

The left button of the mouse allows positioning the insertion point,

The right button allows advancing horizontally the filled text,

The filling validation is identical with that of the line editor (LN),

This is the editor associated by default to a part.

Normal screen (SN)

Screen text editor framed on the left of the part,

Its filling is blocking within the part's limits.

Triggering is caused by the appearance of the writing cursor,

The output is by click out of the part,

The right-hand button validates the filling.

Screen with advance (TS)

the editor is identical to the normal screen editor (SN) except that:

The number of lines is not limited by the part's height, thereby allowing to insert lines below the limits of the part.

Centered screen (SC)

the editor is identical with the normal screen editor (SN) except that:

The text is centered in the part.

Graph (GR)

Figure 3:
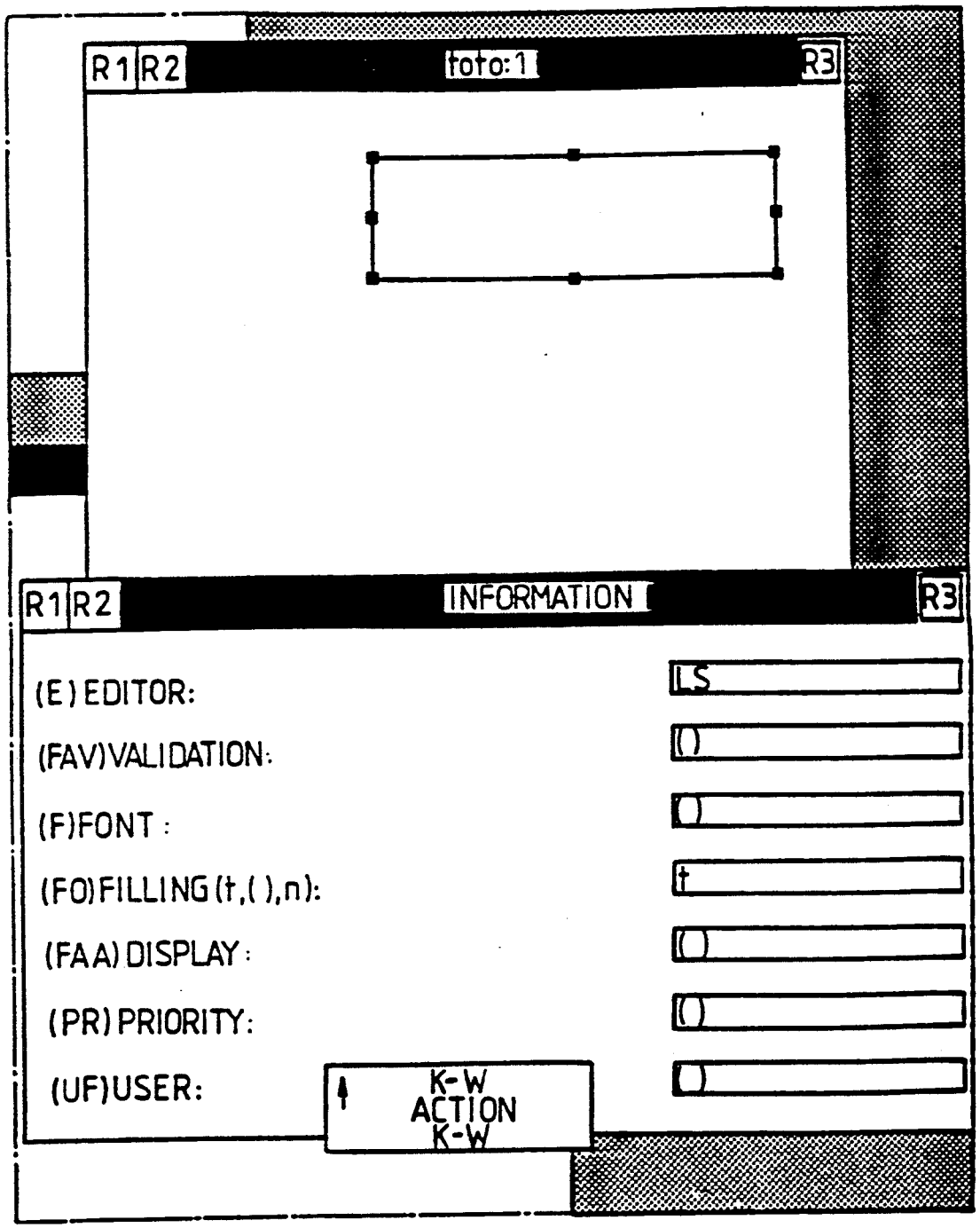
FIG. 3 shows a form during creation and in association with a data window.

Editor of graph objects,

Its triggering allows selecting an object and to move it provided the left mouse button not be released, A click on the right button causes a menu to appear which offers validation of filling and operations on the object which can be implemented by the left-hand button. Among these operations are drawing or decoration (for instance background coloring). In FIG. 3 the display of eight marks consisting of black squares on the rectangle bounding a part denotes the selection and allows modifying the object dimensions.

Menu (MN)

The editor transforms a part into a menu zone containing the name of a list of choices and the articles of the list (in the form of graphic objects, in particular strings of characters), The selected object is inverted as long as the left button remains depressed (FIG. 1, BASE FILE menu), Releasing the left button causes editor output and validation of "filling" (object selection).

Cross (CR):

The editor displays (or erases) a cross at triggering,

Validation of activation by releasing the button is optional.

Brightness selection (SE)

The editor darkens (or brightens) the part at triggering.

Validation of activation by button release is optional.

Click (CL)

The editor inverts all the page, or associated part as long as the button remains depressed, Activation validation is achieved by releasing the button.

Temporary menu (PM)

Input by the left button into this editor triggers the display of a temporary menu built-up from data stored in a so-called user field (UF). IN the embodiment mode of the invention described herein, the information is a LISP list consisting either of title string at the head of the strings of articles or a particular Le-Lisp function called CREATE-MENU preceding the other data and allowing to create effectively the menu only once.

Vertical (SV) and horizontal (SH) advances

Editor allowing the vertical/horizontal advance of the contents of a reservoir part associated with the part under consideration, comprising an advance bar thanks to a function defining a pair of advance bar and reservoir part.

The proper position of the cursor of the motion bar is provided either by re-displaying the bar or after selecting this same bar.

User-editor (EU)

In addition to the preset editors discussed above, the method of the invention also allows the user to create particular editors capable of reading the mouse events and processing them in very specific operations, In the programmed LISP mode, this entails the creation of special functions, for example (from #: editutil:select
 (<part> <x> <y> <same>) (<sl>... <sN>)

In this case this function shall be called when the part <part> with which the editor "editutil" is associated will be selected by the left button of the mouse (event DOWN or DRAG); <x> and <y> are the mouse coordinates relative to the window; <same> is zero (not or ( ) ) if the part hasn't been selected yet, "t" (yes or a symbol different from ( ) ) in the other case, that is in the event of DRAG inside the part.

For some editors (line LN. line with motion LS, cross CR, selection brightness SE), the method of the invention permits sequenced filling of the parts depending on their rank or order numbers; in the programmed mode filling, the order function is defined as follows:

(ORDER—PARTS <part1>—<partN>) [SUBR with arguments].

In case of repetition of a part at the end of the list, there will be infinite looping of filling with destruction of the information filled-in at the end of cycle.

Reference has been made to some links with the user application for the presentation of the two forms illustrated in FIG. 1. Their incorporation into a variation of the method of the invention is highly advantageous. These original link functions assume prime significance because on one hand they they assure the autonomy of the form relative to the user application and on the other they allow its practical use, moreover for simple and flexible implementation.

* The first link function associates a post-validation function (FAV) triggered by filling validation with the part. This first function is applicable in the course of data input from the screen toward the system, for instance in data acquisition or in acquiring a selection carried out by the user during a dialogue.

In the programmed mode, it appears in the form (FORMPART—COMPUTE
 >part> | <fn> <arg1>—<argN>]) [SUBR with 1, 2 or N arguments].

The function <fn> denotes the post-validation action function (FAV) which is called with 2 mandatory arguments page and part and its optional arguments.

If <fn> is not provided, the link function (FORM-PART-COMPUTE) displays the filling function associated with the part.

Illustratively, this link function allows exiting from a blocking filling. In that case the post-validation action function shall be defined as follows:

(from fn(page part( (exit endformfilling
 <sl>—<sN>)).

* The second link function offers communication toward the user application during the system data output toward the screen and in fact it does amount to the inverse of the first function. Prior to the display operation, this second function calls a pre-display action function (FAA). This action function allows filled data manipulation and therefore the simple call of the page re-display function, or the part's, whether explicitly programmed or implicitly by the occurrence of a mouse event in the dialogue window, allows updating a form.

In the programmed mode, it assumes the form (FORMPART—DISPLAYFN <part>[<fn> <arg1>—<argN>]) [SUBR with 1, 2 or N arguments].

The function <fn> denotes the pre-display action function (FAA) which is called with 2 mandatory arguments the page and the part and its optional arguments.

If there is no filled-in data in the form part, the function <fn> shall be called by default. Illustratively this will allow searching pre-existing information in a data base present in the system prior to display.

Frequently this second link function is associated with a priority function relative to the content of the part between the user (interactive dialogue) and the user application (the data system in the state prior to the display instruction). This priority function offers the choice (option yes or t) to call the pre-display action function before there is any display of information filled in the part (in that case the application has priority); in case of default (option no or nothing), the user shall have priority and the pre-display action function shall be called only in the absence of filled in data.

In the programmed mode, the function is defined as follows:

(FORMPART—APPLI/USER—PRIORITY<part->[<y/n>]) [SUBR with 1 or 2 arguments].

To conclude the discussion of the method of the invention and of diverse variations of implementation in the programmed mode,, other functions "F" so far not discussed but often used shall be surveyed below

A. Functions relating to the form (CREATE-FORM<name>SUBR with 1 argument].

It creates a form named <name> consisting of a string of characters.

(STORE-FORM<form>[<file><mode>]) [SUBR with 1, 2 or 3 arguments].

Preserves the form in a complete-name file <file> or else (under the name <form>) in an extant file in the current directory of the operating system UNIX.

The mode (1, 2 or 3) specifies the kind of selected safeguard:

mode 1: the form is preserved in its state for instance during creation/construction, mode 2: the form shall be preserved ready for filling (the part editors then being alerted to be ready for call),. however return to construction mode (for form modification) is authorized, authorization to return to construction mode.

At return, the inverted instruction divides itself into an option for loading the pages without display and an option of loading the pages with display.

B. Page-related function (ADD-PAGE-TO FORM<form><x><y><w-><h>[<title>][SUBR with 5 or 6 arguments]

Adds a new page to the form <form>. The corresponding window is created and displayed at position (<x><y> on the screen with a width <w>and height <h>. If the title <title> is provided, it becomes the title of the window, or else the window title shall be the form name followed by the creation number of the page.

(SHOW-PAGE ) [SUBR with 1 argument].

Displays the contents of the page . This function serves to implement the pre-display action function.

(REDISPLAY-FORMPAGE ) [SUBR with one argument].

Erases and re-displays the page . This function serves to implement the pre-display action function.

(FILL-PAGE [<tilexit>]) [SUBR with 1 or 2 arguments].

Triggers the page filling mode (alerts the part editors). Provision of expression <tilexit> triggers a blocking filling on the page (that is, there is impossibility to activate another window or to carry out a command prior to filling validation of the zone being considered).

C. Functions and methods concerning the parts:

They apply mostly also to the pages and sub-parts thanks to the possibility of recursivity offered by the Le-Lisp interface.

(SENDQ DISPLAY <part>)

This method allows displaying besides the rectangle the contents of the part (its sub-parts, or skeleton and filled-in information).

(REDISPLAY-FORMPART <part>) [SUBR with one argument].

Erases and re-displays the part <part> (provided the corresponding page be current). This function also is used to implement the pre-display action function.

(ADD-PART-TO-PART <part><x><y><w-><h>) [SUBR with 5 arguments].

Adds a new sub-part (part) to the part (page) <part>.

The new sub-part (part) is created at the position <x><y>) relative to its window page. Its contour is not displayed.

The editor associated by default is the line with motion (LS).

(FORMPART-USER <part>[<value>]) [SUBR with 1 or 2 arguments].

Allows reading the value of the field reserved to user for the page or part <part> or to assign to it the value <value>.

ORDER-PARTS (for memory)

D. Functions concerning the editors:

(FORMPART-EDITOR <part>[<editor>]) [SUBR with 1 or 2 arguments].

Associates the editor <editor>to the page or to the part <part>. By default will display the associated editor.

(FORMPART-VALUE <part>[<value>]) [SUBR with 1 or 2 arguments].

If the value <value> is not furnished, this function displays the set of data used in the page or the part <part>by the associated editor.

(FORMPART-FILLED-INFO <part>) [SUBR with 1 argument].

This function displays the information preserved following filling under the editor associated with the page or part <part>.

(FORM ) [SUBR with 1 or 2 arguments].

Associates to the page or part <part> the font of characters, of number or of holes <font>. If the number <font>is not furnished, this function displays the associated font number.

By default, a font of number zero or ( ) is associated to the pages and parts.

(FORMPART-FILLING-VALIDATE <part->[<y/n>]) [SUBR with 1 or 2 arguments].

For the editors "cross" (CR) and "brightness selection" (SE), authorizes or denies the automatic triggering of the post-validation action function of the page or part <part>associated to the page or part <part> depending on <y/n> being t (yes) or zero.

E. Functions concerning the graphic objects:

Essentially these are addition functions (ADD) or subtraction functions (DELETE) concerning the various types of objects such as "character strings". "rectangle", "icon", etc.

(ADD-STRING-TO-PART <part> <x> <y> <string> [<font> <editor>]) [SUBR with 4, 5 or 6 arguments].

This function concerns, but without display, the association of the string <string> with the page or the part at the position <x> <y> relative to the window page and in the number font <font>.

The editor <editor> manages the string <string>. By default, this editor shall be the one associated with the part. If the string must be a component of the the part's skeleton, the value of the <editor> argument shall be "skeleton", whereby each part (page) can define a set of graphic objects (which can be manipulated as such) called the skeleton of the part (page) and unresponsive to the editor associated with the part. Other editors are available in this function to manage the string <string>, for instance the editors "line" (LN), "menu" (MN), "click" (CL) or "graph" (GR).

F. Function concerning the interactive software "F":

These functions were set up to facilitate the implementation of the active interface "F".

(INTERACTIVE-FORMN-HANDLING) [Subr with 0 argument].

This function creates and displays the window containing the "form" icon ("F" in a square frame) shown in FIG. 1.

The selection of the icon "form" by means of the right or left button causes the display of an enter menu "ENTER in the interactive mode, this enter menu being subsequently shown.

(ALLOWFORBID-PAGE-BUILDING  <y/n> [SUBR with 2 arguments].

This function allows or forbids the interactive building of the skeleton of the page  depending on <y/n> being t or null. In the former case a "CREATION" menu may be associated to the corresponding page zone.

By default, interactive building shall be forbidden for the forms created by programming.

(BUILD-FORMPAGE -SKELETON ) [SUBR with 1 argument].

Puts the page  in the interactive building mode under the control of a CREATION menu itself providing a number of sub-menus.

(EXIT-FORMPAGE-BUILDING ) [SUBR with 1 argument].

Resets the page  into the filling mode.

(BUILDFORMMENU-ADD <type> <name>) [SUBR with 2 arguments].

Allows adding a new <name> selection into the sub-menu entitled <type> of the menu CREATION used in the building mode in interactive manner. Illustratively for the sub-menu EDITOR, the user may add the name of a specific editor after its creation.

Be it borne in mind that the LISP programming also entails the creation—in the LISP sense—of a tree-type form structure with its set of descriptors at each tree node. These descriptors shall be different depending on the root representing the entire form, an intermediate node describing part or a window for a particular field being involved. This tree-like structure shall not be described here in detail but allows a number of variations by the programmer-user regarding the form-building rules according to the specifications found in the present description. A specific pre-programmed interface for handling the form structure (reading safeguard) corresponds to the above specific structure. This interface is incorporated into the software set "F" loaded in the central memory. Again the creation of the form structure and of the programmed interface stays within the current competence of a programmer-user familiar with the Le-Lisp language.

In the light of the above and still in illustrative manner, a specific program (the LISP function "menu-application") is written below together with the use of the Le-Lisp primitives and the functions "F", where this program allows to generate (here to create) the first form of FIG. 1 named "table"; the coding employed is that adopted in the Le-Lisp 15-2 where in particular the function names appear in small print:

1.1 (of menu-application ( ))
1.2 (let* ((form (create-form "table")
1.3 (page (add page-to-form 20 30 230 60 "data base") )
1.4 (formpart-editor page 'popmenu)
1.5 (formpart-user page
1.6 '(create-menu DATA BASE "new employee" "see/modify employee") )
1.7 (formpart compute page 'operation)
(add string-to-part page 20 24 SELECT AN OPERATION ( ) 'skeleton )
1.9 (show-page page ))).

The reading of this program elicits some comments as follows:

The instruction "let" on line 1.2 allows creating temporary (local) variables such as "table" and "data base" associated to previously defined structures, The numerical values 20, 30, 230 and 60 denote the position of the left point of the window "data base" (x=20, y=30), its width (230) and its height (60), The expression on line 1.4 associates the editor "temporary menu" =(PM ='popmenu, The expression on line 1.6 is the content of the user field defined on line 1.5; this content is used by the (PM) editor, The expression on line 1.7 represents the particular link function with a function named "operation" as the post-validation action function, The expression on line 1.8 adds a string of characters to the skeleton (pseudo-editor skeleton='skeleton), The expression on line 1.9 controls the form display on the screen.

It follows from the above that the link with the user-application is very simple and flexible through the resort to the function "operation". This function "operation" may be illustratively defined as follows:

2.1 (of operation (page part selection)
2.2 (selectq selection
2.3 ("new employee" (show-page (employe-form 20 120 )))
2.4 ("see/modify employee" (list employees 20 120 ))))

The expression on line 2.1 shows that the function "operation" with its two first arguments "page" "part" is indeed an action type function associated to the user-application by a link function. From the time of validation of the selection operation, this function shall be called into the temporary menu BASE FILE of one of the two articles "new employee" and "see/modify employee", The expression on lines 2.2 and 2.3 entails the triggering of the function "show-page" in case the article "new employee" was selected. Implementation of this function shall trigger the display at (x=20 and y =120) on the screen of the result of performing another LISP function denoted "employee form" and allowing to generate the second form of FIG. 1 named "employee".

The "employee form" function is defined as follows:
3.1 (of employe-form (x,y)
3.2 (let* ((form (create-form "employee"))
3.3 (page (add-page-to-form form x y 500 320 "emplyee data"))
3.4 (part1 (add part-to-part page 100 20 350 20 ))
3.5 (part2 (add-part-to-part page 100 60 350 20 ))
3.6 (part3 (add-part-to-part page 100 100 350 80 ))
3.7 (part 4 (add-part-to-part page 100 200 350 20 ))
3.8 (part5 (add part-to-part page 100 240 350 20))
3.9 (part6 (add part-to-part page 20 280 60 20))
3.10 (part7 (add-part to-part page 100 280 70 20 )))
3.11 (add string-to-part page 20 64 "name": 'skeleton)
3.12 (add string-to-part page 20 64 "first name": () 'skeleton)
3.13 (add string-to part page 20 104 "address":() 'skeleton)
3.14 (add-string-to part page 20 204 "salary": () 'skeleton)
3.15 (add-string to-part page 20 244 "branch": () 'skeleton)
3.16 (add string to part part6 23 284 "EXIT"() 'skeleton)
3.17 (add-string-to-part part7 103 284 VALIDATE () 'skeleton
3.18 (formpart-editor part3 'screen-normal)
3.19 (formpart-editor part6 'click)
3.20 (formpart-compute part6 'kill-window)
3.21 formpart editor part7 'click)
3.22 (formpart-compute part7 'validate)
3.23 (formpart-user part1 'name)
3.24 (formpart-user part2 'first name)
3.25 (formpart-user part address)
3.26 (formpart-user part4 'salary)
3.27 (formpart-user part5 'branch)
3.28 (formpart-displayfn part2 'check part1 'first name)
3.29 (formpart-displayfn part3 'check part1 'address)
3.30 (formpart-displayfn part4 'check part1 'salary)
3.31 (formpart-displayfn part5 'check part1 'branch)
3.32 page)).

The reading of this program elicits the following comments:

Following the creation of the page "employee data", the expressions contained on lines 3.4 through 3.10 define the seven parts of the page (from P1 through P7 in FIG. 1). They are followed by five lines of page skeleton (for instance the string "name" opposite the part "part1" (P1)), then by two liens of part skeleton (for instance the line 3.16 associating the word EXIT to the part "part6" (P6)), The lines 3.18 and 3.19 concern the editors associated to the parts "part3" (normal screen=(SN)='screen-normal) and "part6" (click=(CL)=click). By default, the editor "line with advance" (LS) shall be the editor of a part, The line 3.2 relates to the call of the post-validation action function "kill the window" which is defined as follows:

(from kill-window (page part) (kill-window page).

This function erases the page from the screen following a click in the part part6(P6), The line 3.23 associates a content having the value "name" in the user field of the part "part1", The line 3.29 allows carrying out the action function "check" before displaying the form(calling the "show-page" function in a user application)

In the present instance, this "check" function is called by default when the part (for instance "part3") is empty before the display action itself induced by the mouse. Thereupon the "check" function allows searching whether part "part1" is empty or taken up by a name "X". In the latter event, the "check" function shall fetch, in a data base file, the contents of the field "address" of the entry corresponding to the name "X" and shall fill the part "part3" (P3).

The function of line 3.29 illustratively is used to display the content of a data base entry. If the name "X" is obtained by selection from a list, it shall be enough, in order to fill the form from the system, to load the value "X" of the selection (through the intermediary of the function "car") into the first element "part1" of the list of parts of the page obtained by means of the function "formpart-parts" . This loading is carried out by means of the function "F" "formpart-line-value" similar to the function "formpart-value". The programmed writing of this latter operation in the user application then assumes the following style:
(from fn
(let* (...)
(when selecting
 (let ((page (employee-form 20 120 ))))
(formpart-line-value (car (formpart-parts page )) selection)
(show-page page ))))).

The above example shows perfectly the autonomy of the forms generated by the method of the invention relative to the application programs. Moreover, it shows the significance of the constituted "F" functions which lend themselves to both the form generating programs and to the application programs.

Lastly, in the discussion of the program mode of the implementation of the method of the invention, mention must be made of the ability of developing preset "F" functions allowing to automatically create a form of one page comprising a column of strings (skeleton), each string being associated with a part to be filled (underneath the line editor) opposite and on the same line.

In the course of the above discussions, the interactive mode implementing the method of the invention has been mentioned several times. Presently this interactive mode shall be discussed exhaustively. Except as otherwise noted, the selection operations cited hereafter shall be carried out using the mouse.

After calling the icon "form" "F" and its display on the screen and the subsequent selection of that icon, an entering menu ENTER shall then be displayed with the following selections:

"ENTER" MENU

1. CREATION
2. LOADING
3. BUILDING
4. EXIT FROM INTERFACE "F".

A selection makes the ENTER menu vanish, it being re-displayed by the new selection of the icon "F".

The selection CREATION in the ENTER menu starts the creation from the beginning of a form in the following manner:

The operation begins with the display of a dialogue window NEW FORM CREATION comprising a filling zone allowing the user to enter the name selected for the form. Following validation of name entry by carriage return, the dialogue window disappears, leaving the space to a new empty window of which the title is the name given to the form and which in fact constitutes the first page of the new form. A CREATION menu is associated therewith and the form is put under the control of this menu. This assumes that the form is in the creation mode (as contrasted with the form filling mode) with editor inhibition.

At this stage the screen of the system appears substantially the way it is shown in FIG. 2. The CREATION menu is of the "card pack" type with six sub-menus respectively called by the click from the right-hand button of the mouse in the corresponding bar. These sub-menus presently shall be discussed and are entitled

"CREATION" MENU

F FONT
E EDITOR
P PATTERN
M MANIPULATION
A ADD OBJECT
S SKELETON.

The sub-menu FONT (F) shown in the Figure consists of the plain selection [N. 1]: normal character font (option by default), [N. 2] bold character font, list may be supplemented in programmed manner by arbitrary fonts of the graphic interface X.11, The EDITOR sub-menu (E) lists all the previously presented editors. Such list may be supplemented in programmed manner by the particular editor(s) developed by the user, The PATTERN sub-menu (P) lists the various available patterns (black, white, gray, checkerboard, shading etc.), The MANIPULATION sub-menu (M) lists the available actions for manipulating graphic objects (sub-parts and skeleton) in a selected part, namely: to assembly, disjoin, copy, bond, erase, destroy the selected object, destroy the part's skeleton, The ADD-OBJECT sub-menu (A) lists the available graphic objects (text, icon, rectangle, square, ellipse, circle, line, character string etc.) as well as the special caption "part of page". the selection of this caption allows adding a part (or a sub part) to a page (or to a part). In that event the selected part is manipulated like a graphic object (and accordingly black marks are displayed on the rectangular contour of the part as long as it is The SKELETON sub-menu (S) lists the available actions as regards the form and/or the page being developed, namely:
Return to the filling mode, that is to exiting the CREATION menu,
Form preservation (with the three options, modes 1, 2 or 3)
See/Modify the part,
Changing the page title,
Re-display the page,
Destroy the entire form,
Destroy the present page.
Add a page to the form,
Manipulate the sub-parts of the part or Page that was selected as graphic objects or as zones in the build mode.

Form creation continues by mouse selection of the the sub-menu ADD-OBJECT, then within this sub-menu of a particular object or the special caption "part of page". For the case of selecting a particular object, the remainder of the object is constructed thanks to the left button as long as it remains depressed, the text possibly being inserted at the position selected by the button. The object shall become a skeleton element of the page (or of the part). In the case of the selection of the caption "part of page", in the ADD-OBJECT sub-menu, the user may build the contour rectangle by means of the mouse (using the left button), he may select the associated editor, and possibly the pattern and/or the font to be used.

The selection of the caption "See/Modify the part" of the sub-menu SKELETON entails the display of an information zone (here a dialogue window) allowing to visualize the selected options for the affected part as regards certain functions or attributes, in particular the editor (E). the post-validation action function (FAV), the font (F), the filling conditions (OF), the pre-display action function (FAA), the priority function (PR) and the"line with advance" user field (UF). As illustrated by FIG. 3, these options appear in rectangular sub-zones themselves interactive and controlled by the editor "line with (LS). The user therefore is enabled to modify the particular selection or even to fill these rectangular sub-zones illustratively to create the links between the form and its application.

In the example of FIG. 3, the information window entitled INFORMATION concerns the single part being created in the page: "toto:1". The displayed options are those assigned by default, more specifically:
LS for the editor,
The value ( ) or null for the post validation action function (FAV)—absence of post-validation type link,
The value ( ) for the character C (selection of font No. 1 of normal characters),
The value t for the filling conditions FO (this assumes authorization by user to fill the part). The other options are either ( ) in the event of user prohibition against filling or an order numeral "n" in the case of sequential filling of the parts of the same page,
The value ( ) for the display action function (FAA) (absence of pre-display type link),
The value ( ) for the priority function (PR) corresponding to user priority relative to application (UF),
The value ( ) for the user field.

Regarding filling the sub-zones (FAV), (FAA), the user has two alternatives:
He may indicate the name of the action function associated to the part (for instance "check", "kill-window", "operation").
He may directly enter the program defining the preset function.

The selection of the caption "action" of the temporary menu "K-W" allows making this window INFORMATION disappear following visual display and where called for to modify certain functions and attributes of the active zone.

At the end of creation, the user shall be enabled—still within the same sub-menu SKELETON—to pass into the filling mode or to proceed to preserve the form.

The selection of the caption LOADING in the ENTER menu causes a dialogue window to appear whereby the name of the desired form may be entered. Once found again, the form is displayed in the state and mode selected during preservation, namely Mode 1: mode creation, Mode 2: filling mode (with possible interactive modification). In this case the transition to the building mode is by selecting the caption BUILDING in the ENTER menu, Mode 3 filling mode In this latter case, selection of the BUILDING caption remains inoperative.

The selection of the caption BUILDING in the ENTER menu entails this form coming under the control of the menu CREATION and the possibility of introducing in it the desired modifications. In particular the selection of the caption "re-display page" of the sub-menu SKELETON allows if desired to call a pre-display function. The return to the filling mode is carried out by a suitable selection from the sub-menu SKELETON.

The interactive filling mode is essentially controlled from the keyboard and/or the mouse. An active zone editor is triggered by the click of the left hand button into the particular page or part, the exit either being automatic when the button is released or by click out of the part. In the case of blocking filling, the user can take no other action than filling the zone (it will be impossible to carry out other commands and/or to act in other windows before validating the filling of the zone). Accordingly it is possible in this manner to suspend a user application following the activation of an interface form.

Reflection easily shows that the interactive implementation of the method of the invention preserves the autonomy principle of the form. However the data window INFORMATION allows to easily set up the link to the user applications. Lastly the layout used in the menu ENTER clearly shows the distinction between the construction and filling modes of the form, and therefore the interactive software "F" can easily be mastered by a novice user.

I claim:

1. A method for generating dialogue windows, hereafter called forms, which can be visually displayed on a screen of a computer system comprising a central processing unit and a central memory loaded with operational software, said screen operating in a multi-window graphic mode, wherein each window is represented on the screen by a contour and is provided with a system of local coordinates and with a graphic context, said method comprising the steps of:
   a. organizing the forms into one or more displayable pages which can each be displayed in one window of the screen,
   b. defining an interactive display region that is responsive to a data signal representing an external event, said external event provided by an operator input device,
   c. associating said interactive display region with a set of functions, hereafter called editors, comprising a first editor responsive to filling of said region by variable information, and a second editor validating an operation of said first editor, said editors being selected either from pre-set editors or supplied as user-specific editors (EU) by programming.

2. The method of claim 1 wherein another of the external events includes a function of an editor-validation capable of validating said activation.

3. The method of claim 2 wherein said page is associated with several parts or active zones and said active zones are associated with a sequence command function (FO), the filling validation automatically triggering the filling of the next zone, said command function selectively enabling the looping of the filling of the next zone.

4. The method of claim 1 wherein at least one action function linked to a selection user-application program is associated with an active zone and a set of functions therefor in accordance with:
   a post-validation action function for the validation operation of the active zone, (FAV); and
   a pre-display action function at the screen for data visualized on the screen and contained in the active zone (FAA).

5. The method of claim 4 wherein the post-validation action function (FAV) is automatically called by the validation function for the set of functions.

6. The method of claim 4 wherein the pre-display action function (FAA) is called by triggering in response to a mouse event in the interactive mode controlling a display command for the content of said zone on the screen.

7. The method of claim 6 wherein the triggering is in an implicit manner.

8. The method of claim 4 wherein the pre-display action function (FAA) is controlled by a priority function (PR) in response to the presence (priority application) or the absence (priority user) of variable information in said zone at the time the pre-display function is called.

9. The method of claim 4 wherein said active zone is associated with a set of functions comprising a validation function for the set functions and, as a post-validation function, an escape function including modifying the control of the set of functions so the set of functions no longer responds to the arrival of new events in the zone.

10. The method of claim 1 wherein the set of functions is selected either from pre-set editors or is materialized as a user-specific editor (EU) by programming.

11. The method of claim 1 wherein the set of functions is selected either from pre-set editors or is materialized as a user-specific editor (EU) by programming from aid pre-set editors.

12. The method of claim 9 wherein each of the pre-set editors comprises a main editing function selected from the following: line (LN), line with advance (LS), left-hand framed text on the screen (SN), screen text with advance (TS), centered screen text (SC), menu (MN), cross (CR), brightness selection (SL), click (CL), graph (GR), temporary menu (PM), horizontal motion bar (SH) and vertical motion bar (SV).

13. The method of claim 1 wherein at least one graphic object is attached to said zone, said object being selectively rendered active by association with a set of functions.

14. The method of claim 1 wherein at least one graphic object is attached to said zone, said object being selectively rendered without being associated with a set of functions.

15. The method defined in claim 1 wherein said screen windows and said active zones appear as extensions of rectangular graphic structures which are variable in size and in position, said extensions being achieved by associating information which is variable, inert or active and controlled by a set of functions.

16. The method according to claim 15, wherein the interactive generation includes form manipulation.

17. The method according to claim 16, wherein said form manipulation includes a step of form creation.

18. The method according to claim 16, wherein said form manipulations includes a step of form modification.

19. The method according to claim 16, wherein said form manipulations includes a step of form filling.

20. The method according to claim 16, wherein the choice of the operation form creation generates a display of a new window allowing the selection of an external event of one of the following menus: font, editor, pattern, manipulation, add object and skeleton.

21. The method according to claim 20, wherein the menu skeleton provides for selection of one of the following operations: return to the filling mode, form preservation, see/modify the part, changing the page title, re-display the page, destroy the entire form, destroy the present page, add a page to the form, and manipulate the subparts or page.

22. The method of claim 1 wherein the active zones are recursively accessed for page and part to establish active sub-zones or sub-parts to associate a page or part of a sub-part having those functions and/or other attributes defined relative to said active zones.

23. The method of claim 1 wherein said external events are derived from a keyboard and pointer type input device.

24. The method of claim 1 wherein each window is created from the beginning.

25. The method of claim 24 wherein said active zone is associated with a data window which can be displayed on the screen to allow an interchangeable association with said active zone of specific functions or attributes belonging to preset categories, and the identification of said functions and of said attributed functions associated with said zone on the visual display.

26. The method of claim 25 wherein said preset categories are selected from the following: editor (E), post-validation action function (FAV), pre-display action function (FAA), priority function (PR), user field (UF), filling sequence function (FO).

27. The method of claim 1 wherein each window is created by modifying a pre-existing window.

28. The method of claim 1 wherein the window is generated in a programmed manner by using a programming language loading into the programmed interface of said computer system.

29. The method of claim 28 wherein said programming language is of the interpreted object type.

30. The method of claim 29 wherein the interactive generation is achieved by software allowing, according to a user's choice, one of the following operations: form creation, form modification, and form filling.

31. The method of claim 28 wherein said programming language is an object-extended LISP language.

32. The method according to claim 1, wherein the user specific editors are programmed using a step of combining a plurality of pre-set editors.

33. The method according to claim 1 wherein the input device is a coordinate data input device.

34. The method according to claim 33, wherein said coordinate data input device is a mouse.

35. The method according to claim 33, wherein said coordinate data input device is an optical pen.

36. The method according to claim 33, wherein said coordinate data input device is a graphic table.

37. The method of claim 1 wherein the window is generated in an interactive manner with the screen.

38. The method of claim 1 wherein the method is implemented in a programmed manner.

39. The method of claim 1 wherein the method is implemented in an interactive manner by using a set of specific instructions complementary to those of a programming language loaded in the programmed interface of said computer system.

40. The method of claim 1 further including the step of generating masks for acquiring data on the computer system screen.

41. The method of claim 1 further including the step of generating masks for displaying data on the computer system screen.

42. A computer system with a central processing unit and a central memory loaded with operational software comprising:
- at least one screen operating in a multi-window graphic mode and at least one input device displacing a cursor on said screen,
- an interface programmed with a programming language loaded into said system, and
- a set of software developed at least in part in said programming language for dialogue windows to be visually displayed on said screen and for organizing each window into one or more pages each of which is displayed in one window of the screen and for associating for display at least one active zone, page or part of a page with a data signal form an external source representing an external event.

* * * * *